(12) United States Patent
Volpato et al.

(10) Patent No.: US 11,559,920 B2
(45) Date of Patent: Jan. 24, 2023

(54) SEAL GASKET ELEMENT FOR A MIXING APPARATUS, METHOD FOR OBTAINING AND APPLYING THE SAME, AND SPECIAL EQUIPMENT FOR FITTING THE SAME

(71) Applicant: AFROS S.P.A., Milan (IT)

(72) Inventors: Marco Volpato, Milan (IT); Maurizio Corti, Milan (IT); Fabio Fini, Milan (IT); Luca Campi, Milan (IT)

(73) Assignee: AFROS S.P.A.

( * ) Notice: Subject to any disclaimer, the term of this patent is extended or adjusted under 35 U.S.C. 154(b) by 237 days.

(21) Appl. No.: 16/701,945

(22) Filed: Dec. 3, 2019

(65) Prior Publication Data
US 2020/0180187 A1    Jun. 11, 2020

(30) Foreign Application Priority Data
Dec. 5, 2018   (IT) .......................... 102018000010844

(51) Int. Cl.
*B29B 7/48*       (2006.01)
*B29B 7/76*       (2006.01)
(Continued)

(52) U.S. Cl.
CPC ............ *B29B 7/488* (2013.01); *B29B 7/7684* (2013.01); *B29B 7/7689* (2013.01);
(Continued)

(58) Field of Classification Search
CPC ..... B29B 7/488; B29B 7/7684; B29B 7/7689; B29B 7/7694; B29B 7/80; B29B 7/7631;
(Continued)

(56) References Cited

U.S. PATENT DOCUMENTS

| | | | | |
|---|---|---|---|---|
| 3,706,515 A | * | 12/1972 | Keuerleber | B29B 7/7673 264/DIG. 83 |
| 3,799,199 A | * | 3/1974 | Rumpff | B29B 7/7694 264/DIG. 83 |
| 4,082,512 A | * | 4/1978 | Wingard | B29B 7/7689 422/240 |
| 4,099,919 A | * | 7/1978 | Leidal | B29B 7/7615 366/173.1 |

(Continued)

FOREIGN PATENT DOCUMENTS

| | | |
|---|---|---|
| DE | 2801942 A1 | 7/1979 |
| DE | 202006000819 U1 | 5/2006 |

(Continued)

*Primary Examiner* — Charles Cooley
(74) *Attorney, Agent, or Firm* — Laubscher & Laubscher PC

(57) ABSTRACT

A method for obtaining and applying a sealing gasket element on a slide-valve sliding in a cavity of an apparatus for the recirculation and mixing of chemically reactive polymeric components, comprises the steps of: obtaining from an elastic-plastic material a precursor element of the seal element, with a grid structure having a reticular shape; positioning the precursor element around the slide-valve; exerting on the precursor element, through temporary clamping elements, a radial compression and contraction action to insert it and couple it to one or more housing seats provided on the slide-valve so as to obtain the seal element well coupled to the latter; progressively removing the clamping elements to sequentially release successive parts of the gasket element and gradually free the slide-valve to gradually introduce the parts of the slide-valve—freed in succession—in the housing cavity allowing the sealing gasket element to gradually expand radially due to the elastic return by adhering tightly to the inner surface of the same housing cavity. The special equipment for fitting the sealing gasket element on the slide-valve and the so obtained recirculation and mixing apparatus is also described.

10 Claims, 12 Drawing Sheets

(51) Int. Cl.
*F16J 15/08* (2006.01)
*B29B 7/80* (2006.01)
*F16J 15/46* (2006.01)
*B01F 35/30* (2022.01)

(52) U.S. Cl.
CPC .............. *B29B 7/7694* (2013.01); *B29B 7/80* (2013.01); *F16J 15/0887* (2013.01); *B01F 2035/351* (2022.01); *F16J 15/46* (2013.01)

(58) Field of Classification Search
CPC ........ F16J 15/0887; F16J 15/46; F16J 15/545; B01F 2035/351; B01F 35/00; B29C 43/52; B29C 2043/028; B29C 43/36; B29C 43/027; B29K 2027/16; B29K 2027/18; B29L 2031/26; B29L 2031/265
USPC ......... 366/162.4, 162.5, 167.1, 173.1, 159.1; 422/131, 133–135
See application file for complete search history.

(56) References Cited

U.S. PATENT DOCUMENTS

| | | | |
|---|---|---|---|
| 4,108,606 A * | 8/1978 | Wingard | B29B 7/7471 521/917 |
| 4,279,517 A * | 7/1981 | Wallner | B29B 7/7689 366/159.1 |
| 4,332,335 A | 6/1982 | Fiorentini | |
| 4,778,659 A * | 10/1988 | Inoue | B29B 7/42 264/DIG. 83 |
| 5,082,633 A * | 1/1992 | Stuper | B29B 7/7694 422/135 |
| 5,785,422 A * | 7/1998 | Eidenmuller | B29B 7/7668 422/133 |
| 9,308,512 B2 * | 4/2016 | Fiorentini | B29C 67/246 |

FOREIGN PATENT DOCUMENTS

EP 1927448 A2 6/2008
WO WO-2007082606 A1 * 7/2007 ........... B29B 7/7663

* cited by examiner

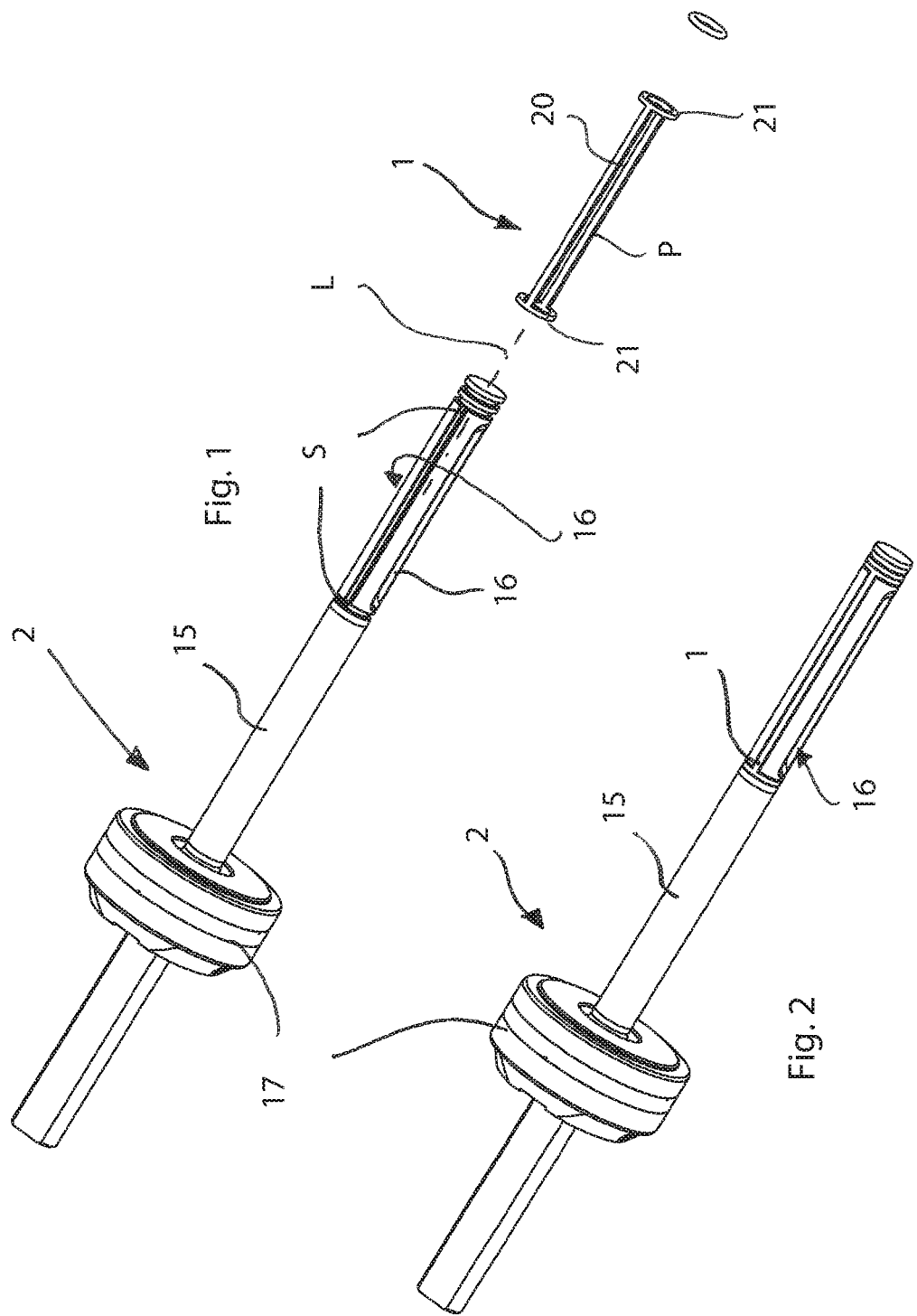

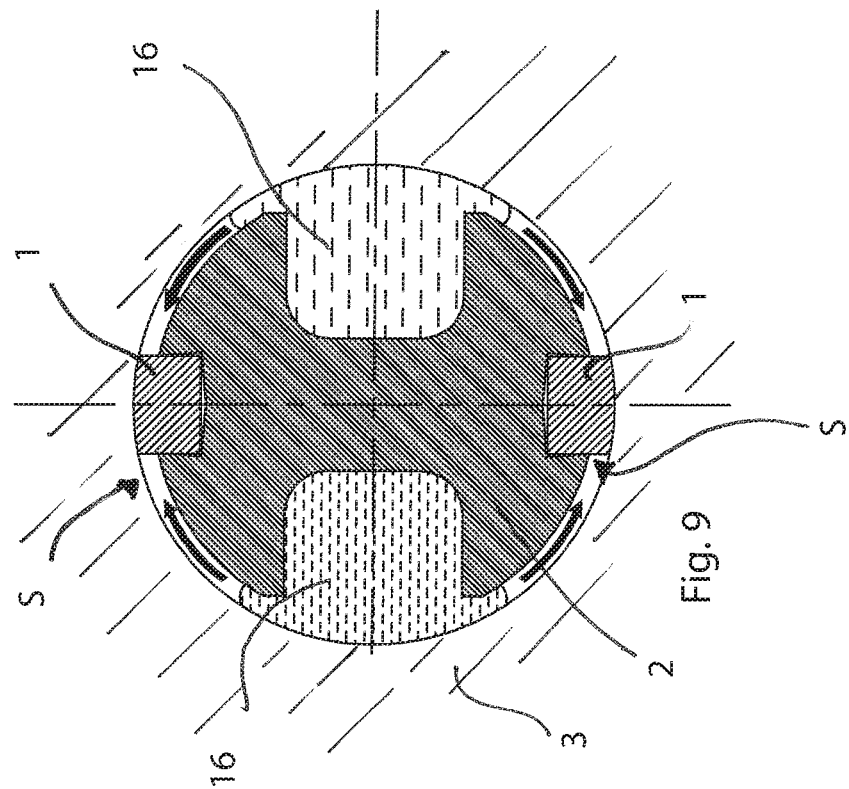
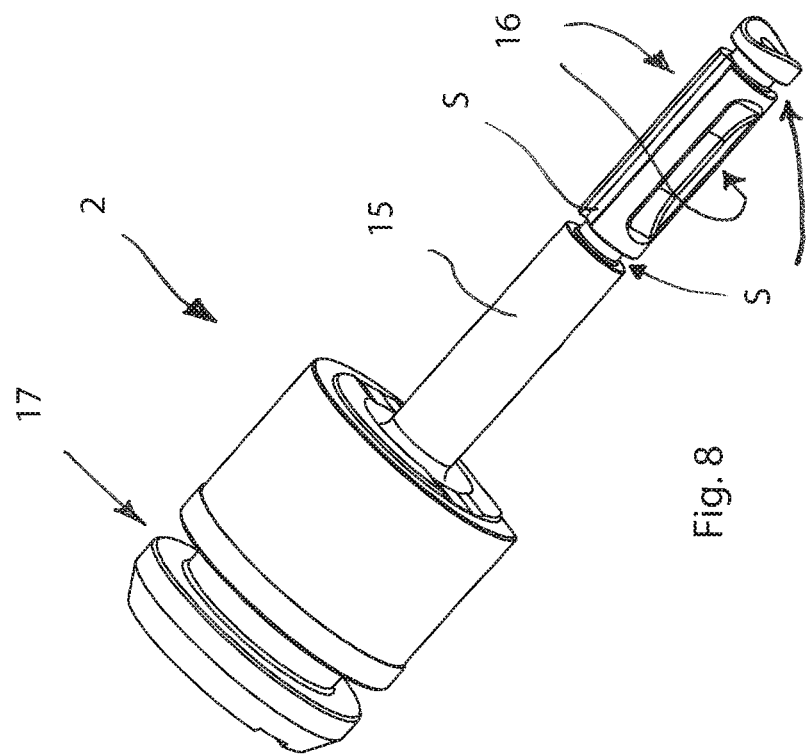

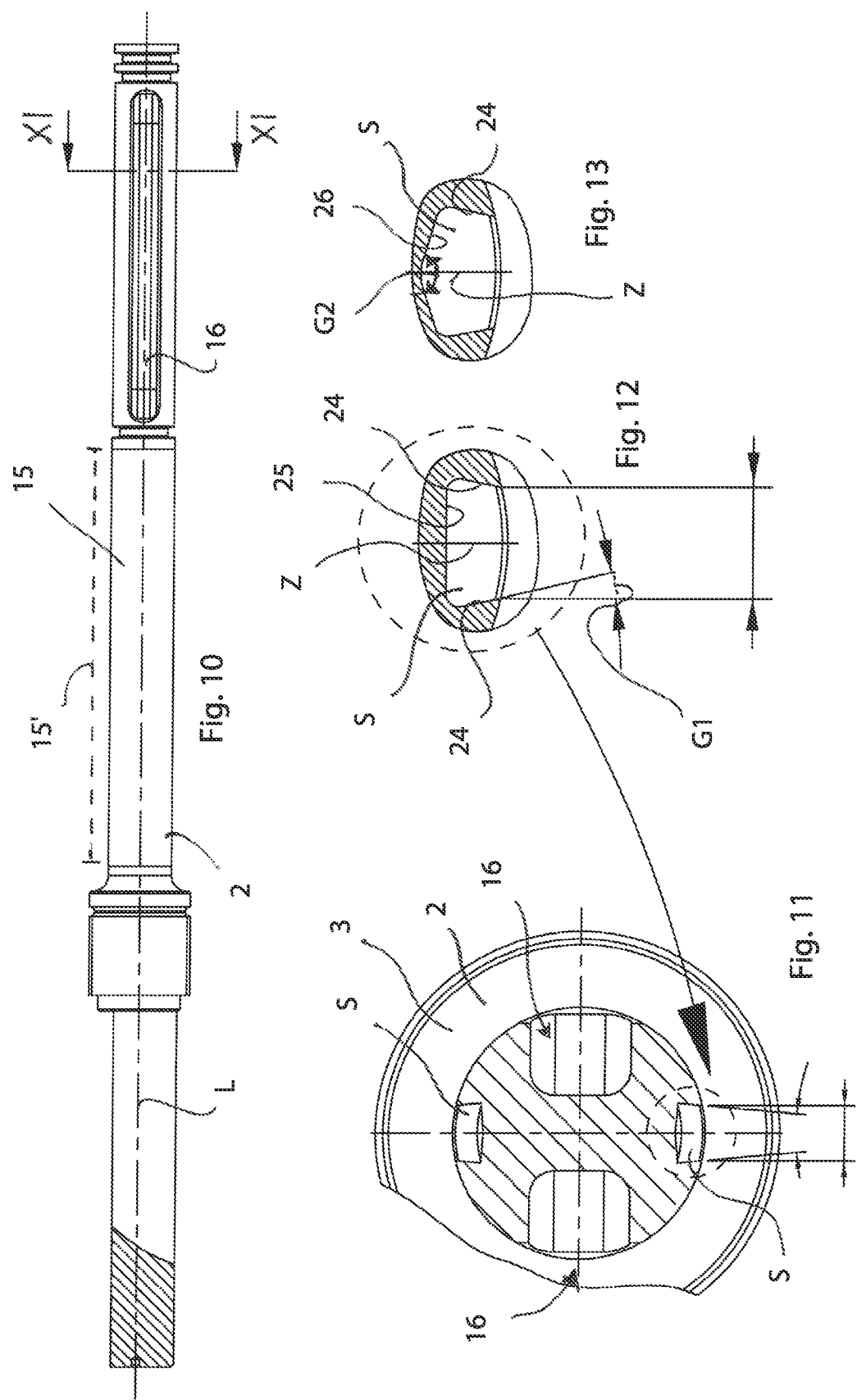

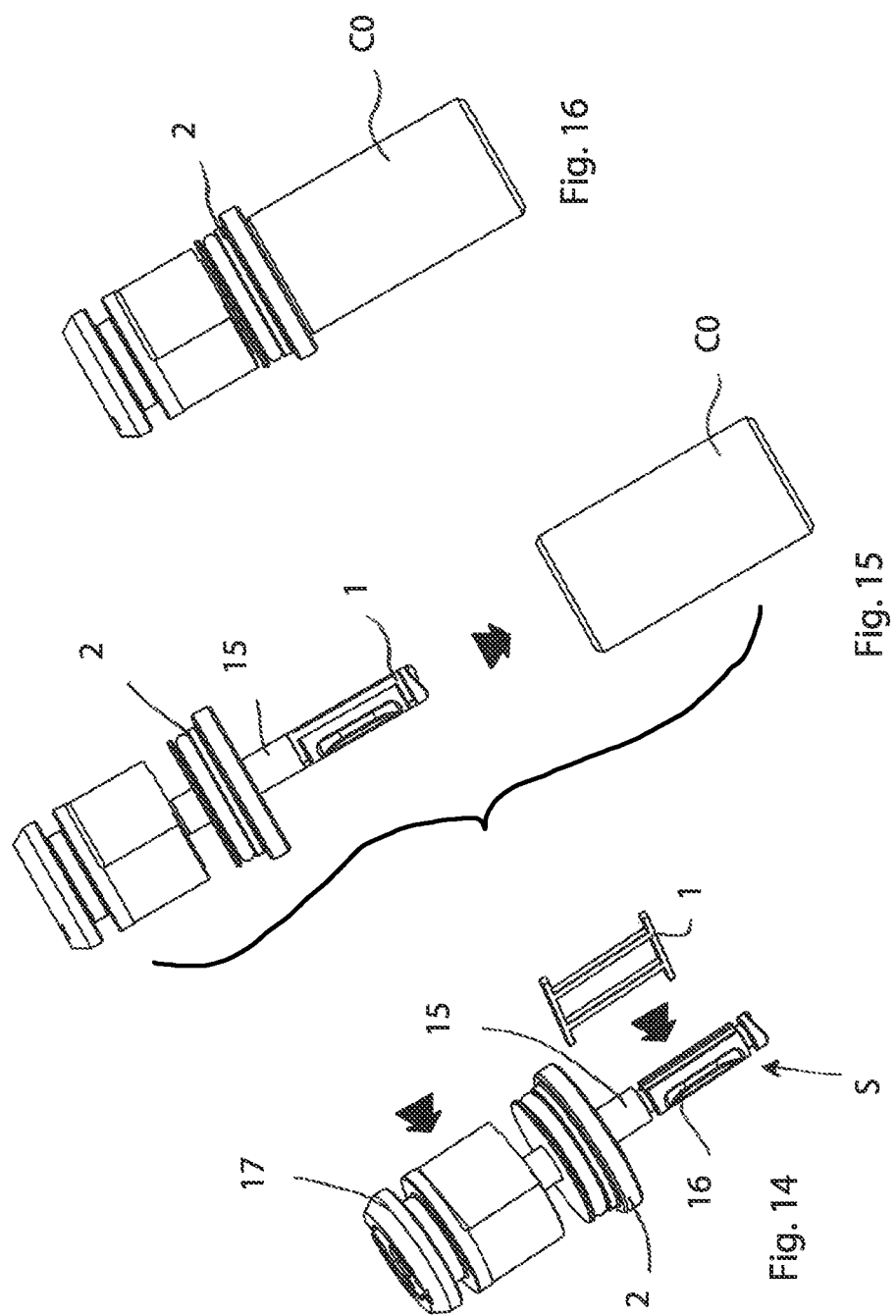

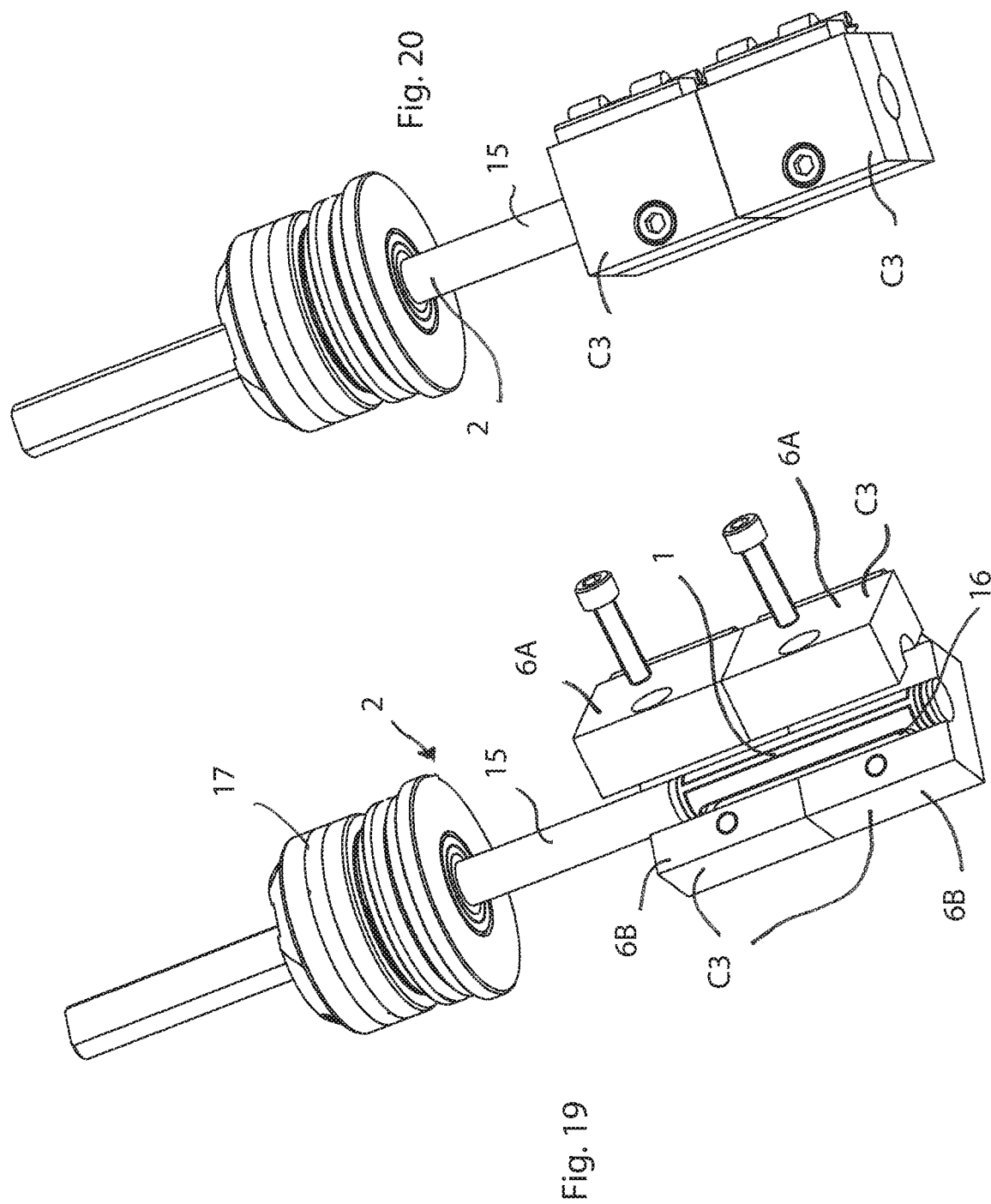

SEAL GASKET ELEMENT FOR A MIXING APPARATUS, METHOD FOR OBTAINING AND APPLYING THE SAME, AND SPECIAL EQUIPMENT FOR FITTING THE SAME

CROSS-REFERENCE TO RELATED APPLICATIONS

This application claims priority of Italian Patent Application No, IT-10-2018000010844 filed Dec. 5, 2018, The entire content of this application is incorporated herein by reference.

BACKGROUND OF THE INVENTION

The present invention relates to a seal gasket element for a recirculating and mixing apparatus and a method for obtaining such a seal gasket element and applying it to the recirculation and mixing apparatus which, more specifically, comprises a high pressure mixing head for polymeric components suitable for forming a chemically reactive mixture.

In particular, the seal gasket element according to the invention has a grid geometric conformation, of a reticulated type and is intended to be applied to a valve element for mixing and recirculating the polymeric components, such a valve element being also referred to as slide-valve, which is slidingly movable in the mixing chamber of the head.

STATE OF THE ART

High pressure mixing apparatuses are known for polymeric components that are suitable to form chemical mixtures of reactive resins intended to be injected or dispensed in a mold.

Mixing apparatuses are known for example from U.S. Pat. No. 4,332,335 and EP1927448.

A mixing apparatus, more precisely a high pressure mixing head, comprises a mixing chamber in which two or more polymeric components—which are adduced through respective openings and associated injectors provided with nozzles for the formation of jets—are made to collide frontally to each other or against the walls of the mixing chamber with high kinetic energy to generate high turbulence and forming a reagent mixture which, once left the mixing chamber, flows into a delivery duct to reach subsequently the mold.

The mixing head is internally provided with a slide-valve slidably reciprocable in the mixing chamber.

The slide-valve is controlled by a hydraulic piston head which is coupled on the rear by a joint, or formed integrally in one piece with the stem of the slide-valve itself.

The driving head slides inside a hydraulic cylinder associated to the mixing head. The hydraulic cylinder and the head control the sliding movement of the mixing slide-valve during opening and closing.

The slide-valve is provided with longitudinal slots which, in the operative position in which the same slide-valve closes the mixing head, face on front ends of the injectors and make the individual components recirculate toward respective recirculating conduits.

More precisely, the slide-valve is movable axially between a withdrawn position, in which it frees the nozzles for the injection of reactive chemical components and opens the mixing chamber toward the dispensing duct, and an advanced position for the recirculation of the individual polymer components, in which the slide-valve closes the mixing chamber, ejects the residual mixture directly in the delivery duct and simultaneously intercepts the jets of the chemical components and carries out the recirculation by directing the flows towards the recirculation ducts.

In the forward closed position, the longitudinal slots intercept the injection nozzles putting them in communication with the recirculation ducts arranged to the rear, so as to convey the reactive polymer components to the respective tanks.

Before being dispensed and mixed in stoichiometric ratio, the polymeric components are dosed and circulated, separately from one other, at an appropriate ratio in mass flow rate and at suitable pressures generated by means of the injectors and the respective nozzles through the slots of the slide-valve in order to ensure that, after the transient for reaching the required process parameters for the individual resins, the dosage occurs in the correct stoichiometric ratio between the reactive components and in order to ensure the correct setting and stabilization of the fundamental process parameters such as mass flow rate, temperature, pressure, ratio and dispersion of possible fillers or blowing agents.

The longitudinal recirculation slots may have different geometrical shapes and depth variable as a function of the geometry of the mixing chamber and of the slide-valve on which they are obtained.

Generally the profile in plan of the slots has a longitudinally elongated shape with parallel edges and semicircular end edges or straight edges to form a rectangular profile etc.

It is possible to provide two or more slots, on the basis of the number of components to be mixed, which are arranged mutually parallel and distributed sequentially in the circumferential direction, on the cylindrical surface of the slide-valve.

Between one slot and another there remains defined a portion of cylindrical surface or partition that separates a chemical component present in slot from the contiguous slot and similarly separates it from the front and from the rear part of the slide-valve. The partitions have the function of keeping the components separate both during the recirculation phase and in the operative condition of null flow in the slots which occurs both when the dosing apparatus is inactive and when the slide-valve is in the retracted delivery and mixing position.

The partitions take the components separate from one other even when the slots remain filled with resins which are static during the mixing active phase.

The presence of the partitions between the slots and around the front and to the rear of the slots therefore prevents that the components, passing from a slot to the other, form lumps of reacted material within the slots themselves with consequent damaging transfer during recirculation toward one of storage tanks.

The cylindrical body of the slide-valve, where there are not obtained the slots, is made with ground smooth surface and with coupling clearance very reduced (from 4 to 120 micrometers) with the seat (whose front forms the mixing chamber) in which it slides.

The considerable reduction of the coupling-clearance between the stem of the slide-valve and seat of the mixing chamber ensures the discharge, also by scraping, of the reacting resins during the closure of the slide-valve.

In the case of mixing chamber having a short longitudinal size (which is typical of "L" configuration of the mixing heads where the mixing chamber opens into a discharge duct positioned perpendicularly with respect thereto) also the recirculation-slots are short and their extension is the minimum required to connect the inlet openings of the jets (coming from the injectors) with the recirculation-openings.

In the case instead of mixing chamber rather elongated toward the outlet and which extends up to outflow section (typical of straight or linear configuration of mixing heads where the mixing chamber extends with continuity defining more downstream a downflow duct of the same outflow section) in order to better convey the mixture flow in output from the head, avoiding as much as possible a turbulent motion, the slots extend toward the outflow area up to the vicinity of the front end of the slide-valve; this serves to maintain contained the circular section of scraping and blinding of the injectors in order to reduce to a minimum the period of time during which the blind condition goes on when the slide-valve is advanced or retracted.

In synthesis, the slots extend in such a way as to stop on the front and on the rear of the slide-valve, and the cylindrical sections and the cylindrical separating partitions defined and interposed between the slots, by virtue of the reduced clearance into the coupling and by virtue of the viscosity of the chemical components and of the mixture, normally operate as sealing members to prevent or reduce the transfer and leakage from a slot to the other and to prevent the escape toward the front area and in the rear part of the slide-valve.

The reactive components, being in the liquid state and subjected to different pressures from one slot to the other, tend to leak in reduced quantities between a slot being at a higher pressure and the adjacent slot to a lower pressure and also on the front of the slide-valve.

When the resins are very viscous and the slots distant (partitions rather thick) the leakage can be tolerated by the reduced clearance between mixing chamber and the slide-valve.

However, there are particular circumstances such as:
resins with low viscosity and/or recirculated at high temperatures which therefore leak copiously even in restricted passages,
loose couplings between the slide-valve and relative seat in the mixing chamber
recirculation slots and side-valves having considerable lengths (especially in the case of mixing straight heads),
one or more resins are in the respective recirculation-slot at a high pressure (e.g. when in the resin there is dissolved a blowing gas agent having high vapor pressure such as carbon dioxide $CO2$)
resins that, even in minimum amounts, rapidly polymerize in mutual contact,
one of the resins contains in dispersion another liquid which is classified as dangerous that, therefore, must absolutely not leak nor contaminate the circuit along which another resin flows,
which represent critical conditions of use in which no leakage is tolerable of the resins or reagent components between adjacent slots or front and at the rear of the slide-valve.

In these cases, it is therefore of fundamental importance to prevent, during recirculation of the chemical components with the slide-valve in advanced closed position, the individual chemical components from leaking from a slot to the other slot and mixing mutually thus contaminating the tanks. It is further important to avoid leakage and zones downstream of the slots of the slide-valve, that is to say toward or coming from the chamber of the delivery conduit. The delivery duct in the "L" heads houses the self-cleaning stem of the delivery duct itself, which can have a reduced cross-section in the part behind the self-cleaning head; the reduction in section is subject to possible accumulation and clogging of resin reacted in the case in which this might leak from the front of the slide-valve toward the dispensing chamber when the self-cleaning stem is in the closed position.

Moreover, a part of reagent resin might leak from the dispensing chamber toward the mixing chamber—then in the recirculation slots—when the self-cleaning stem is open in a retracted position if the pressure in the mold and in the delivery duct is higher than that in the slots.

In the heads of "straight" type, the delivery duct is the simple continuation of the mixing chamber and therefore a leakage from the front of the slots would cause a leakage of the resins toward the outside; whereas, the presence of a high pressure in the cavity into which the resin is injected—for example due to sudden saturation of the filling of the cavity or due to the presence of fiber that hinders the flow of the resin—would cause a leakage of resin reagent into the slots of the slide-valve during the dispensing step.

In order to cope with these leakage problems, on the slide-valve there are arranged one or more annular sealing elements which are positioned anteriorly and posteriorly to the slots and are housed in circular seats and arranged to oppose the circular front and rear leakage of the polymeric components.

The function of these sealing elements is to contribute to isolate, fluidically with respect to each other, the recirculation slots and isolate them also with respect to front and rear portions of the slide-valve, thus avoiding the undesired fluid leakages referred to above.

The application of simple annular gaskets on the slide-valve has not allowed to solve the problem of how effectively avoid the leakage of resins; in fact the frequent reciprocating movements of the slide-valve between the retracted open position and the forward closed position, in particular the interaction with the edge regions of feed holes, which the injectors and the recirculation holes face, cause a rapid deterioration of the aforesaid annular gaskets. The annular gasket, normally available on the market, also cannot be inserted along longitudinal slots if they do not have a lozenge conformation or a geometrical configuration which makes possible the adaptation of their annular shape.

In conventional mixing equipment it is therefore necessary to carry out repeated and frequent stops, with inevitable long periods of interruption of the production, for the cleaning and maintenance interventions necessary for the replacement and/or the restoration of worn gaskets.

It is also known the use of gaskets, applied and made by fillings of sealing resin. In substance, on the front and rear zone of the slots, on the cylindrical surface of the slide-valve, suitable circumferential grooves are formed where it is applied, instead of a normal gasket available on the market such as an O-ring circular, a polymerizing resin in the form of paste.

The polymerizing resin is cast into the slots and also on the surface of the slide-valve, is allowed to polymerize for the necessary time, also for example by heating it, is then removed in the part beyond a certain diameter by turning and/or grinding so as to assume the projection useful to seal the surfaces with which it comes into contact in the mixing chamber, for example the front part of the slide-valve, thus acting as a sealing element for the resin with respect to the outside.

It is also know a polymerizing resin hardener which is sufficiently elastic and is applied to a reticule of small channels that surround each slot on the back, on the front and along the separating partitions.

The surface of the excess cured resin is then turned and/or ground, as far as leaving project the thickness necessary to act as a sealing gasket.

The use of this type of gasket, applied as fillings of resin and/or sealing pastes, is not free from problems and limits still unsolved.

For example, U.S. Pat. No. 3,799,199 describes an apparatus with a slide-valve of the mixing chamber, on which there are obtained transverse sealing grooves that intersect a plurality of longitudinal grooves and are intended to receive the resin which by curing generates a sealing element with sealing ribs which extend longitudinally and transversely.

A drawback of this apparatus is given by the fact that, especially in conditions with high viscosity of the resins and of strong imbalances of pressure between the polymeric components, the reactive mixture is often not able to reach and restore the worn parts of the polymerized sealing element.

Moreover, this type of sealing element obtained by polymerization of the same mixture be dispensed, has further drawbacks.

In apparatuses of this type the reacted mixture tends to stick the slide-valve to the delivery duct.

The adhesion forces can be such as to generate also high stresses by subjecting the slide-valve and the sealing arrangement to excessive fatigue and seizure phenomena during the alternating sliding motion.

These drawbacks are encountered similarly, also in apparatuses described in EP1979143, U.S. Pat. No. 4,279,517 and DE2801942.

Hereinafter there is described more specifically the prior art manufacturing method of these types of conventional sealing gaskets which are applied in the form of polymerizing resins and the problems deriving therefrom. In general, according to these methods, there is provided filling with resin the grooves by different techniques, for example by manual spreading or by casting on the surface while the piece is rotated, or by injection into a jig-unit.

The resin which the conventional sealing is made of, is generally a bicomponent reactive resin which is at first pre-mixed with its hardener and is then spread over the whole surface of the slide-valve by means of a dispenser or a support spatula after having previously closed temporarily the recirculation slots with a shaped buffer. In this way the channels or grooves—intended to house the future sealing element—are filled without therefore affecting the recirculation slots already protected by the aforementioned buffers.

During the operation of application of polymerizing resin, the slide-valve can be made to rotate to render homogeneous spreading and left rotate about a horizontal axis until the solidification which can be accelerated by carrying out a heating thermal treatment by means of hot air or inside a furnace.

Solidification can also be accelerated by the use of infrared lamps or by irradiation with ultraviolet light.

Alternatively the resin can be injected into the channels or grooves of the slide-valve by closing them subsequently in a suitable mold or jig composed of two parts, clamped on the slide-valve.

However all these methods incorporate, during the application of the resin in some areas, the presence of air bubbles or cause the formation of vacuoles due to the overlay/junction of the layers above and below skin where the resin does not penetrate uniformly. In correspondence of these bubbles and vacuoles, once the resin has been turned and ground, some dot areas arise in which the reactive components leak further; subsequently the leakage is evident in that it leads progressively to the formation of small droplets on the front of the slide-valve. Of course, the leakage is more accentuated between the slots where the phenomenon is not visible but creates over time accumulations of reacted material.

Once the polymerization of the resin is over, which is therefore sufficiently solidified and well adherent to the surface of the channels/sealing grooves, there is provided the removal by turning and grinding—by the rotation of the slide-valve—of the parts of excess resin.

The treatment with resin which is turned and ground also implies further problems.

In order to explicate the sealing function, the size of the final resin-covered surface must exceed that of the hole. During the grinding of the outer surface of the final resin, it is allowed project with respect to the diameter of the slide-valve by a suitable quantity such that it can be compressed during the introduction step in the housing seat in which it is intended to slide (that is to say the mixing chamber) and thus form the seal by deformation and compression of the resin itself. Since the resin has a low elasticity and some dissimilarities due to the deposition, both during the operations of insertion of the slide-valve in the respective hole and during functioning, the following phenomenon occurs: the friction forces during the movement and the passage in front of the holes of the injectors, combined with the compression inside the hole, can cause the detachment of large pieces of the resin application which often does not regenerate by itself, because it is washed out by the frequent recirculation cycles.

Although the above described technique for obtaining a seal by application of solidifying resins is often advantageous with respect to traditional applications of seals of the "O-ring" type or the like, however there are enumerate many limits and drawbacks as illustrated hereunder.

At first, the preparation cycle requires a perfect cleaning of the sealing channels/grooves/gorges and of their surface in order to enable an adequate adhesion of the resin which is spread; if the surface is not adequately cleaned, the adhesion is not effective thus causing, during the use, a detachment of pieces of polymerized resin.

Moreover, it is quite difficult to be able to apply and spread the polymerizing resin mixture without incorporating air bubbles.

The solidifying resin often contains air bubbles trapped or vacuoles at the junction or superposition regions of the layers which reduce the resistance and duration thereof. Moreover if relatively large air bubbles are generated, it is necessary to remove the resin and to repeat the resin operation even several times.

The operations of preparation of the slide-valve, coating, solidification and subsequent working operations are slow and costly and require a particular attention to the surface finish to the diameter necessary to achieve the seal.

Moreover, even in the absence of the problems listed above, during functioning of the slide-valve, sliding alternately between the forward position and the retracted position, a gradual abrasion of the solidified sealing resin occurs due to the repeated movements and because of the fact that the application of the resin, very easily, undergoes a possible softening on the surface caused by contact, through chemical interaction, with the liquid components reactive, which entails a premature wear during the sliding.

The resin, after some tens of thousands of cycles, loses its state of initial compression and, because of the inevitable cracks and of the reduction of thickness, also loses part of its outer surface necessary for the hydraulic sealing.

Therefore it is necessary to repeat the resin operations, that is to say the application of the new resin, after having previously disassembled the slide-valve and removed the old resin.

Finally, regeneration with the reacting resins works and lasts in the areas in which no washing of the resins occurs during the recirculation of the resins, whereas where the washing does not occur (typically in the passage in front of the injectors), the resin regeneration does not arise, indeed the flow tends to wash away also along the remainder of the slot).

The operation for cleaning the seats intended to receive the sealing resin is very delicate and expensive.

Again there is provided the rotation of the slide-valve with the heating operation in order to make the resin react and solidify in a short time, after which it is subjected to a grinding operation and then a control of the ground resin and checking of the sealing is carried out.

Unfortunately all this of course implies the need that the aforesaid operations are performed by specialized workers, with long machine idle times and increased costs of management and maintenance of the mixing apparatus.

A further problem is due to the chemical compatibility which is not always known, of the sealing resin at the contact with the reactive liquid resins.

Therefore, in several cases a rapid degradation of the seal can occur due to a chemical etching and in order to restore the same sealing it is necessary to search for other resins more or less compatible.

Another drawback of solidifying resins is given by a not sufficiently low coefficient of friction which then, during sliding with the surface of the mixing chamber, results in a rapid wear of the seal and in a higher resistance to sliding for the slide-valve.

Moreover, the limited elasticity of the sealing elements made of polymerized resin does not allow to keep the recirculation-slots sealed when in at least one of them pressures of the resin rather consistent occur with respect to the adjacent slot/s, for example, differences in pressure of 20 bar.

Over the years also other techniques were tested for realizing the sealing elements that unfortunately have not led to the overcoming of the above mentioned limits.

For example, it was attempted to enclose the slide-valve into a sealed cylindrical mold under pressure, by injecting in the sealing seats the thermoplastic material or the reacting resins.

Also in this case the cleaning of the surfaces is fundamental to ensure an adequate adhesion of the thermoplastic material which is injected under pressure.

This technique is very laborious due to the need to guarantee a perfect hermetic closure of the mold and to avoid the inclusion of air bubbles; moreover the use of bivalve molds is required that are configured ad hoc for the exact size of the slide-valve and resistant to high pressures, which results in high manufacturing costs.

In the light of the above description, there are therefore wide margins of improvement for the production of seal elements for sliding units in mixing equipment, in particular for the slide-valves of mixing heads for reactive components.

OBJECTS OF THE INVENTION

Main object of the present invention is to provide a solution capable of overcoming all the above mentioned limits and problems and allow the achievement of further advantages.

In particular, one object is to provide a method which allows to obtain, in a quick and economical way, a sealing gasket element having high performance and able to perform its sealing function successfully, compact and without vacuoles and of air bubbles and also highly resistant both to the wear due to sliding and to wear deriving from chemical attack, not subject to cracking and to washing out therefore and having long operating life with a consequent substantial reduction of times and number of necessary interventions for maintenance.

Another object of the invention is to provide an equipment for mounting the sealing gasket element which is structurally simplified and convenient to use, able to allow the application of a sealing gasket element on a slide-valve of a mixing head in an easy, rapid and repetitive manner, by exploiting the rheological properties of the material which constitutes the sealing gasket element.

BRIEF DESCRIPTION OF THE INVENTION

The above can be achieved by a method according to claim 1 and by the sealing gasket element obtained therefrom, as well as by a special equipment for mounting the sealing gasket element on a slide-valve of a mixing head as defined in the attached claims.

The invention also relates to a mixing apparatus comprising the sealing gasket element referred to above.

Thanks to the invention all the above mentioned aims are achieved. In particular, the application of the sealing member, made of material which is widely compatible, prepared separately, is very quick and easy, there is not the need to clean the housing seats with special solvents, there is no risk of inclusion of air bubbles or the risk of the presence of vacuoles it's not necessary to perform grinding/turning operations, heat treatment and to wait for the polymerization occurring in the known art.

Thanks to the invention there is further obtained a sealing gasket element having a friction-coefficient very reduced, whose operative duration is at least twice the sealing elements generated by polymerization of resin of known type.

It is finally possible providing instructions and spare parts for the application in situ of the seal at a department of mechanical maintenance without the need for special equipment and for a long training of the operators.

BRIEF DESCRIPTION OF THE DRAWINGS

All the features of the method, of the sealing gasket element, of the special equipment for fitting the same, according to the present invention will be more clearly evident from the following description and from the accompanying drawings relating to some embodiments, in which:

FIGS. 1 and 2 are respectively an exploded and assembled view showing a slide-valve provided with a sealing gasket element according to the invention;

FIG. 8 shows a slide-valve without a sealing member, in which the housing seats are visible which are intended to house the sealing gasket element;

FIG. 9 is a cross section of the slide-valve showing the operation of the sealing element according to the invention, housed in its own seat;

FIG. 10 is a side view of a slide-valve on which a sealing gasket element according to the invention is to be mounted;

FIG. 11 is a cross section of the slide-valve in correspondence with the recirculation slots and the housing seats for the sealing element;

FIG. 12 is an enlarged detail of the section in FIG. 11, which shows the cross section outline of a seat for housing the sealing element;

FIG. 13 is a view like the one in FIG. 1 but showing a housing seat with a different geometric shape;

FIGS. 14, 15, 16, 17 show in sequence different steps of the method for applying the sealing element on the slide-valve;

FIGS. 19 and 20 show temporary clamping elements which are part of said special equipment and are coupled to a slide-valve;

DETAILED DESCRIPTION OF THE INVENTION

Figure 4:
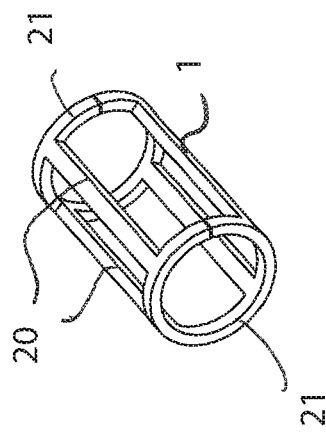
FIG. 4 shows the sealing gasket element of FIG. 3.
Figure 5:
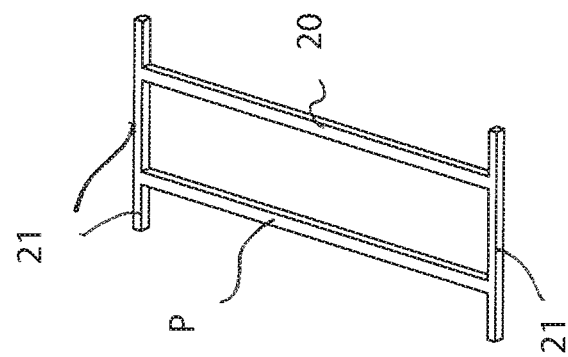
FIG. 5 shows a sealing gasket element having a different geometric configuration.
Figure 3:
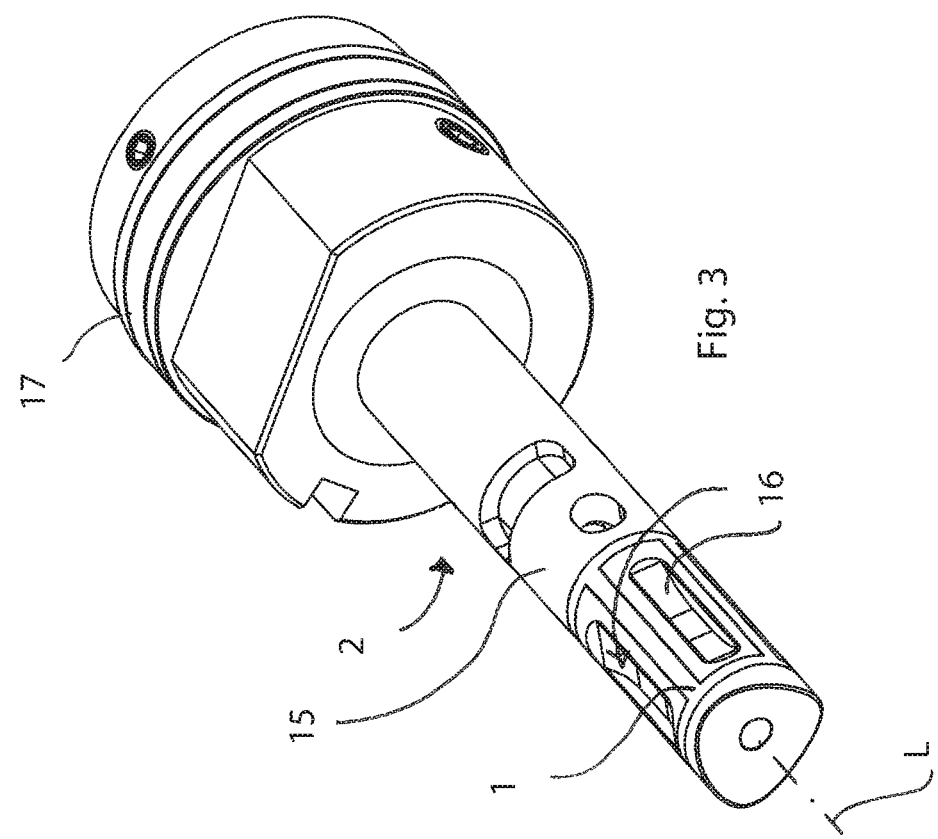
FIG. 3 shows a different slide-valve provided with a sealing gasket element having a geometrical configuration different from that of FIG. 1.
Figure 6:
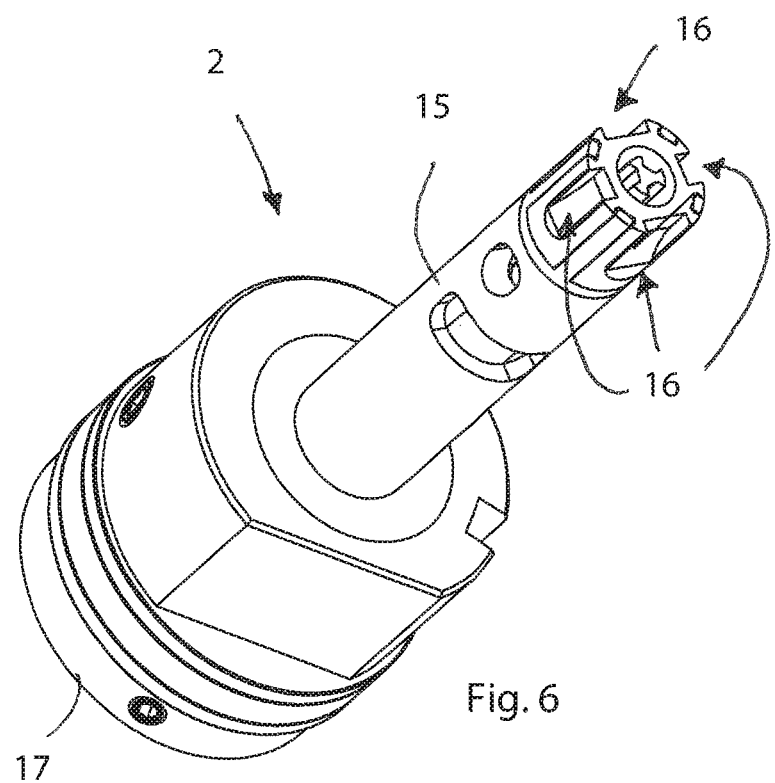
FIG. 6 is a perspective view of the slide-valve of FIG. 3, and particularly the stem portion of the slide-valve with a sealing gasket removed.
Figure 7:
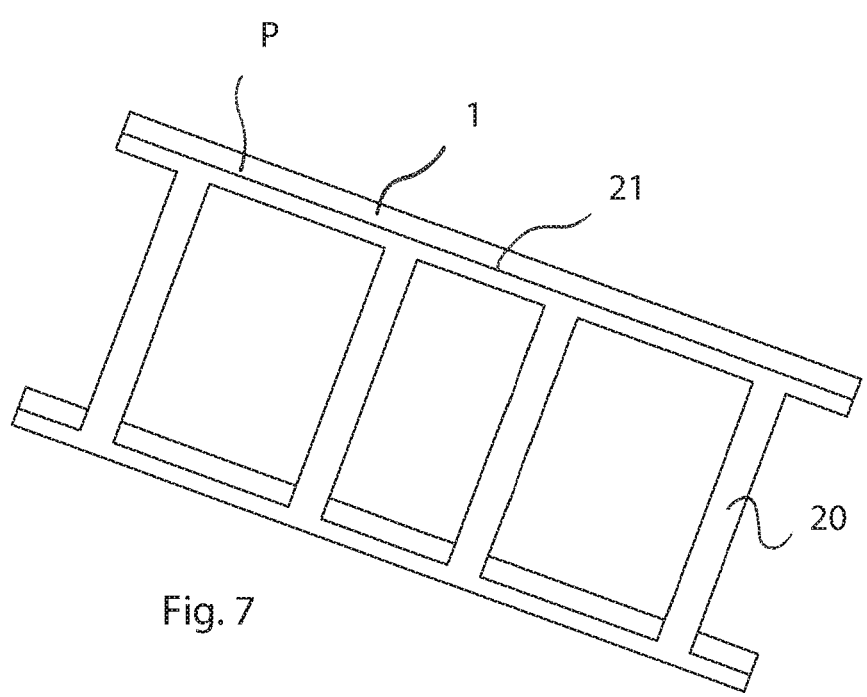
FIG. 7 shows a precursor element, that is to say a plane blank, of the sealing gasket element of FIG. 4.
Figure 17:
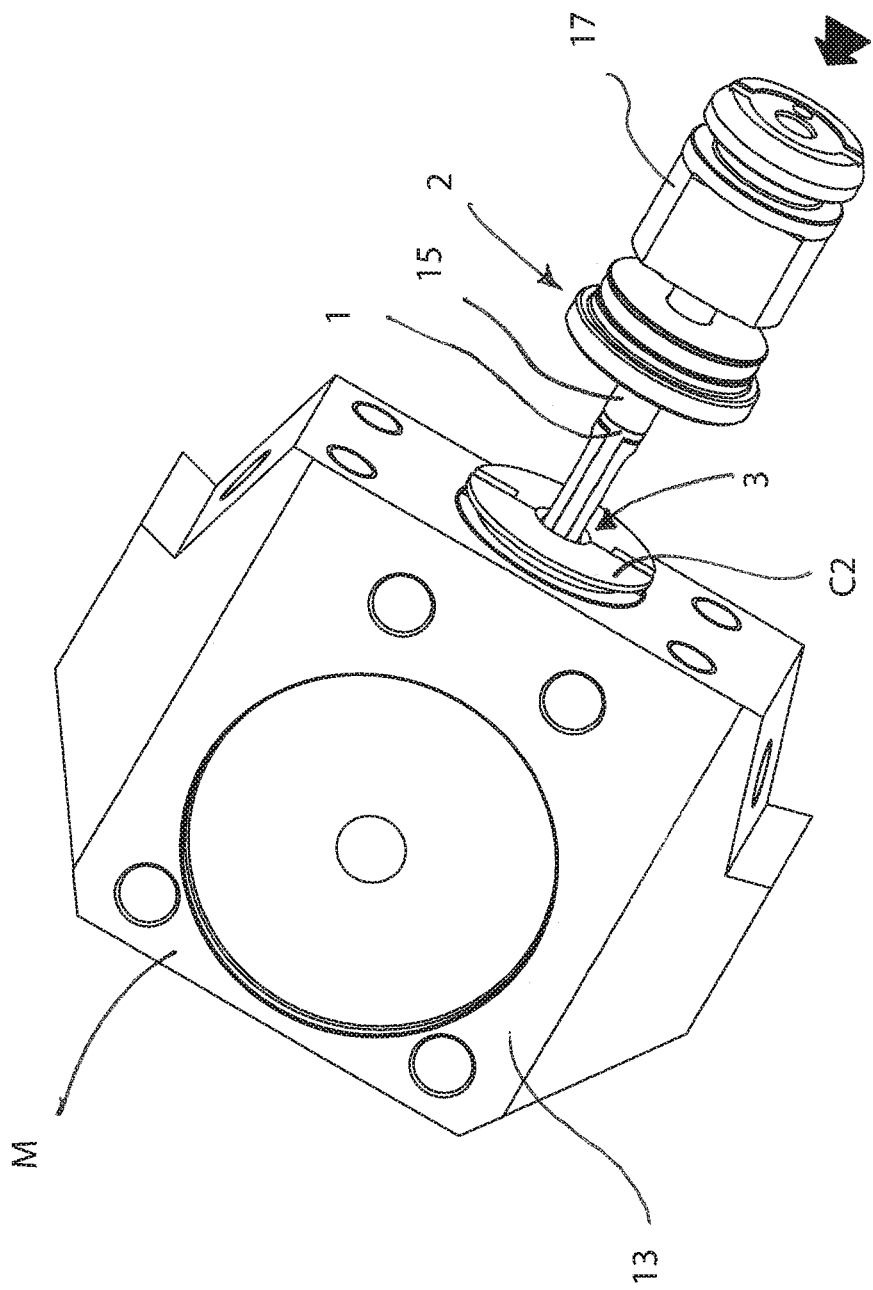
Figure 18:
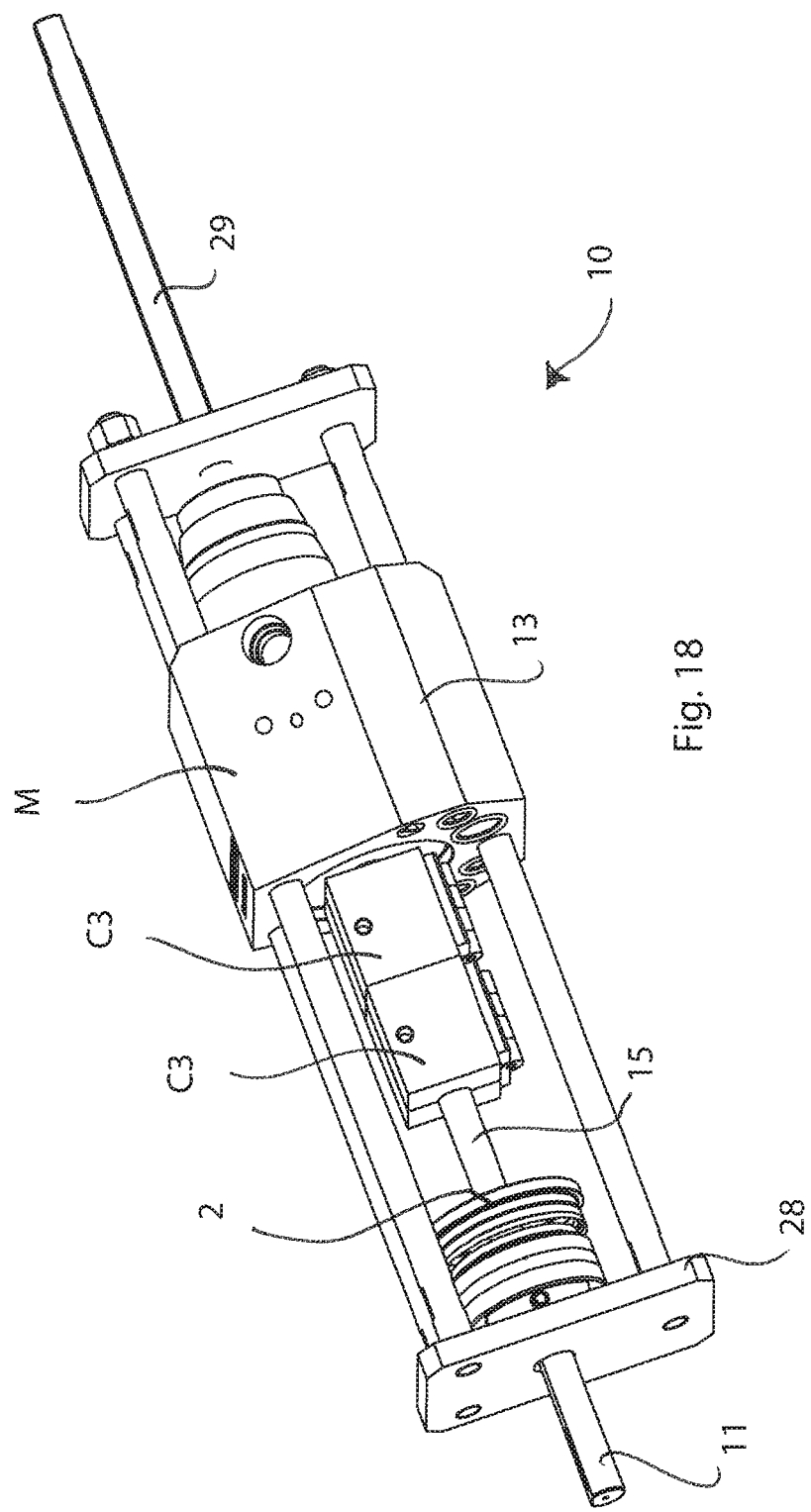
FIG. 18 shows a special equipment according to the invention for fitting the sealing element on the slide-valve and for inserting the slide-valve in the respective seat provided in the mixing head.
Figure 21:
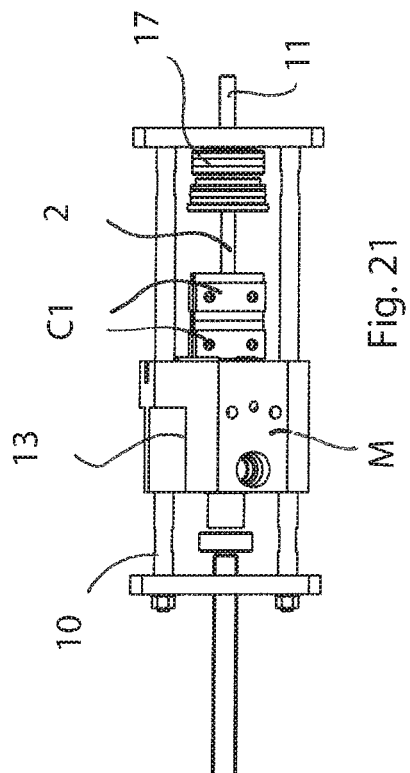
FIGS. 21, 22, 23 are other views of the special fitting equipment.
Figure 23:
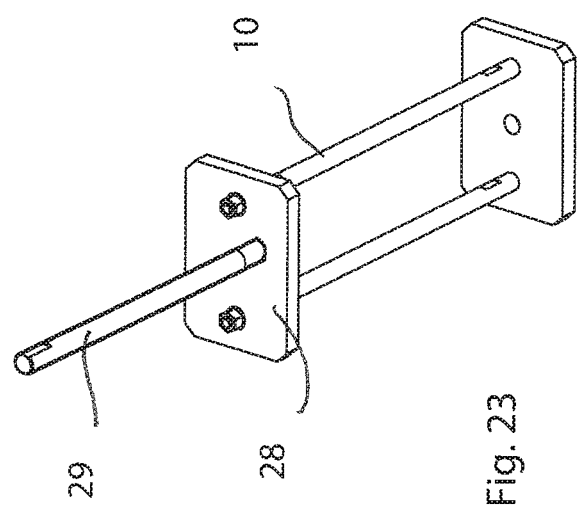
Figure 22:
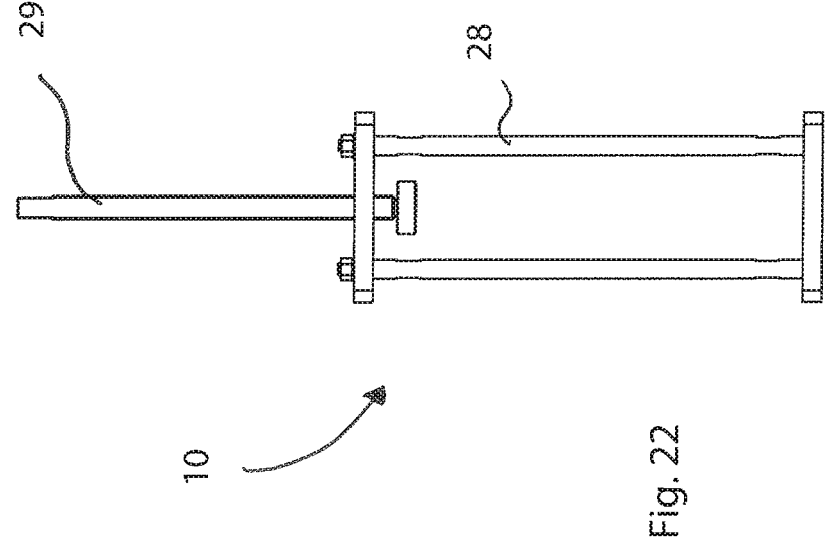
Figures 24, 25:
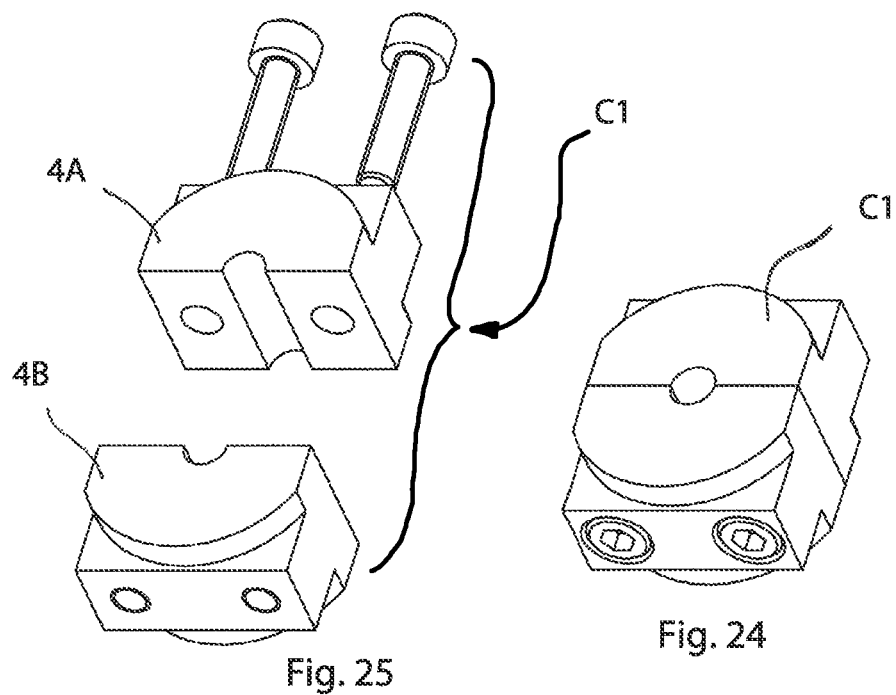
FIGS. 24-29 show further types of temporary clamping elements included in the special fitting equipment according to the invention.
Figures 26, 27, 28:
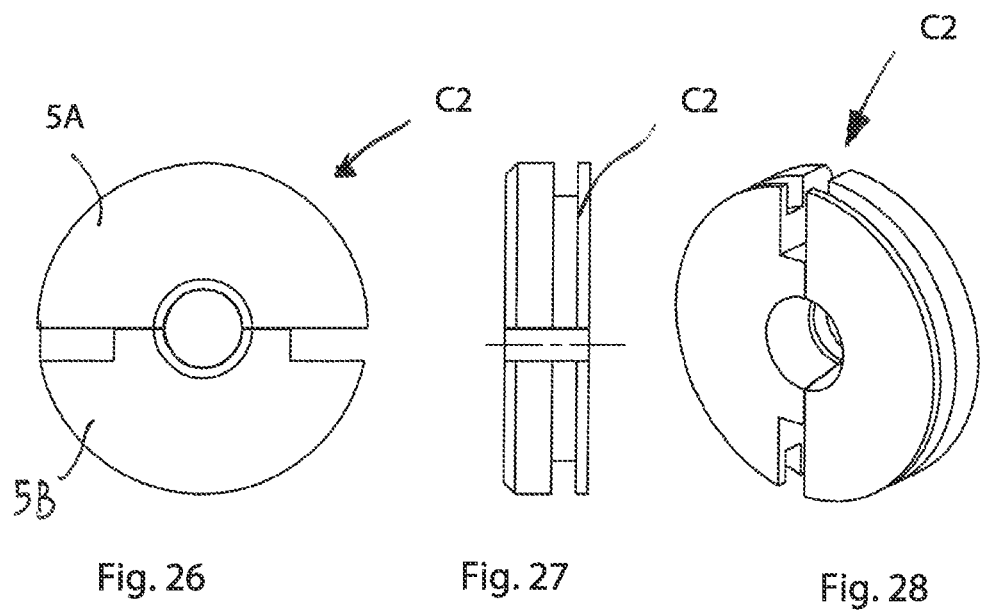
Figure 29:
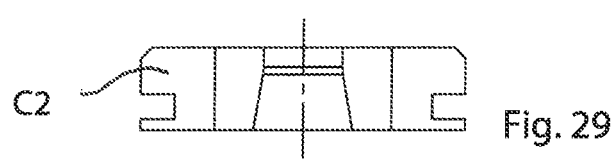

With reference to the attached figures, a sealing gasket element 1 is described according to the invention to be mounted on a sliding member 2 of a mixing apparatus M, more precisely on a slide-valve 2 of a mixing apparatus M for mixing chemically reactive polymer components for obtaining a mixture to be injected or poured into a mold.

The mixture may be, in particular, a polyurethane mixture obtained from a first and at least a second polymeric component, such as a polyol or an isocyanate or a mixture or phenolic epoxy or polyester or vinyl ester or silicone, composed of at least one reactive resin and at least one reactive curing component.

As it will be apparent from the following description, the invention is directed to a sealing system made up from the slide-valve 2 of the mixing apparatus M and from the sealing gasket element 1—made separately from the slide-valve 2—in one piece with reticular structure, or as a grid, and applied to the slide-valve 2 by means of a special fitting apparatus 10, which is also object of the present invention.

In order to better clarify the context of application of the invention, it is very briefly described the mixing head M intended to include the sealing gasket element 1.

The mixing head M has a base body 13 inside which there is a cavity 3, namely a mixing chamber 3 suitable for receiving the polymeric components, by means of respective injection openings and relative injectors.

The mixing chamber 3 also acts as a seat for slidingly accommodating the mobile slide-valve 2.

The mixing chamber 3 also acts as a seat for slidingly accommodating the slide-valve 2.

The slide-valve 2 has a stem portion 15 which extends along a longitudinal axis L and is connected at the rear side to a head portion of a driving piston 17.

On the stem portion 15 two or more longitudinal slots 16 are obtained for the recirculation of the polymeric components.

The slide-valve 2 is reciprocable in the mixing chamber 3 between a retracted open position, which allows the delivery of the mixture, and an advanced closure position of the mixing chamber 3, in which advanced position the injection openings are connected by means of longitudinal slots 16 with the respective recirculation openings obtained on the base body 13.

For the application of the sealing gasket element 1 according to the invention, the slide-valve 2 must be provided with seats S for housing the element 1 with geometrical shapes suitable for receiving the element 1 itself and keeping it in position without necessarily having to treat the receiving surfaces.

The aforesaid geometrical shapes must be in such a way to give the gasket element 1 a sealingly sliding contact against the inner surface of the mixing chamber 3.

In general terms, the method according to the present invention at first provides to obtain, from a material with elastic and/or plastics characteristics, a precursor element P that, once applied to slide-valve 2, will constitute the sealing gasket element 1 itself.

The precursor element P is shaped in such a way to have a lattice structure, or grid structure, i.e. it has a series of longitudinal sealing portions 20 destined to extend in parallel to the longitudinal axis L of the slide-valve 2 and transverse sealing portions 21 destined to extend circumferentially around said longitudinal axis L.

The material with elastic and/or plastics features adopted for the precursor element P, and accordingly for the final sealing gasket element 1 has a low fiction coefficient and is selected from a group comprising:

PTFE (polytetrafluoroethylene),
ETFE (ethylene tetrafluoroethylene),
CTFE (polychlorotrifluoroethylene),
PFA (perfluoroalkoxy),
FEP (ethylene propylene fluorinated),
E-CTFE (ethylene-chlorotrifluoroethylene),
PVDF (polyvinylidene fluoride).

The sealing gasket element 1, made of one of the above materials, is subjected to a very delayed wear and is highly resistant to many chemical agents. Therefore, the operating life of the sealing gasket element 1 is significantly greater than in known sealing systems.

In a version of the method, the precursor element P is provided by cutting it out from a sheet of material with elastic and/or plastics characteristics.

Precisely a plane element is cut out from that sheet which is intended to be subsequently bent and wound around the slide-valve 2.

The geometry of plane element is therefore sized to take into account the expansions/contractions, or in general the geometrical variation which the element 1 undergoes as an effect of its elastic and/or plastic deformation during the forced positioning on the slide-valve 2.

In other words, the dimensions of the grid element (the gasket outline) and its sections are chosen according to the blank plan dimensions of the seats S intended to receive them taking into account the elongation deriving from the fitting operations and, in section, taking into account the adaptation which is obtained with the pre-deformation and the subsequent force-fitting associated with the coupling of the slide-valve 2 with the cylindrical mixing chamber 3.

In general, the longitudinal extent of the sealing gasket element 1 is variable from +10% to −35%, more specifically from +5% to −22% with respect to the corresponding length of the longitudinal housing seats S to take into account the elongation deriving from the forced positioning by pressure-action in the respective housing seats S of the slide-valve 2 and to take account of the contraction of the section consequent to a forced positioning.

Similarly, the circumferential extent of the sealing gasket element 1 is variable from +10% to −12% more specifically from +5% to −5% with respect to the corresponding circumferential length of the transverse housing seats S to take in to account both for the compression of the sealing gasket element 1 and the forced positioning in the respective seats S and to induce a forced junction of the two ends of the element 1 itself.

The cutting operation of the precursor element P can be carried out by laser cutting or by high pressure liquid jet cutting, comprising water enriched with abrasive solid particles.

Alternatively, said precursor element P may be obtained by processing a full round or tubular round bar made of elastic and/or plastic material, so as to give directly a reticular configuration or a cylindrical-shaped grid configuration to the precursor element P before being fitted on the slide-valve 2.

The precursor element P comprises opposite ends intended to be facing each other and for being joined together, for example through a drop of bonding agent based on liquid glue or mastic so as to restrict of an appropriate amount the circumferential extension, in order to result closed and well wound to the stem portion 15 of the slide-valve 2.

Once the precursor element P is obtained, it is pre-positioned around the stem portion 15 and then there is provided the application of a series of temporary clamping elements (C0, C1, C2, C3; C4), according to the invention, arranged to exert on the precursor element P a compression and a radial contraction action which is needed to insert and connect the precursor element in the respective housing seats S provided on said stem portion 15 of the slide-valve 2.

The steps from the application of the precursor element P (from which the gasket element 1 is produced) till the introduction of the slide-valve 2 in the mixing head M are schematically shown in FIGS. 14 to 17.

The temporary clamping elements, in one embodiment, comprise removable mechanical clamping collars (C1, C2, C3), each of which is defined by a respective pair of clamping members (4A, 4B; 5A, 5B; 6A, 6B) which can be coupled and clamped by means of screw elements or equivalent. In FIGS. 17 to 29 various types of clamping collars are shown, the geometrical configurations of which are different from one another to adapt to the specific conformations of the slide-valve.

The special tools provided by the invention, in particular the clamping collars, for the compression and the adaptation of the gasket element 1, have a specific shape and composition and also depend on the geometry of the slide-valve 2.

The mechanical clamping collars C1, C2, C3 are composed by two half-collars (collars divided in half along a diameter) which, fitted together again, assume the shape of a short hollow cylindrical element having a hole/central opening measuring just as the diameter of the slide-valve 2, with excess tolerance with respect to the nominal height D of the latter.

The diameter of the central hole of the mechanical clamping collars (C1, C2, C3) has a tolerance with a lower value equal to D+0,010 mm+Dx0.001 and with a higher value equal to D+0,020 mm+Dx0.0025.

The two half parts are connected and tightened by assembling screws which allow to fit the half parts around the slide-valve 2 carrying the gasket element 1, clamping and keeping the whole assembly well compressed by means of the screws.

A plurality of these clamping collars is applied in series to press the gasket element 1 allowing the latter to deform adapting within the section of the seats and usually to extend in order to fit as required to avoid the formation of creases and bucklings; subsequently the clamping collars are removed one at a time during the insertion of the slide-valve 2 provided with the gasket element 1, compressed and deformed before, in its seat, i.e. the mixing chamber 3.

The housing seats S or slots may have a prismatic section with the open side which is narrower than the bottom or rectangular namely dovetail shaped, with bottom angles which can be rounded.

The shape of the housing seats S, with prismatic section with the open side narrower than the bottom or rectangular namely dovetail shaped, combined with the deformability of the material used for the sealing (for example PTFE), which allows a certain sliding and adaptation, act so that the gasket element 1 suitably fits in the region that accommodates it, once forcibly inserted by compression.

For the application of the sealing element 1, there may be a heating step for the slide-valve 2 and for the temporary clamping elements (C0, C1, C2, C3; C4) in order to facilitate and accelerate the elastoplastic fitting of the sealing gasket element 1 in the respective housing seats S.

In particular, for the fitting and the pre-deformation of the seal element in the seats S, a conical insertion unit C0 is used constituted by a tightening and compression bush in which the central hole is provided with an initial conical part and a subsequent cylindrical part. The initial conical part has the purpose of gradually exerting an action of pre-fitting of the seal element, the latter being shaped as a plane grid, to the cylindrical shape of the seats in which it must be fitted. In this step, the ends of the radial section of the grid sealing gasket element 1 are mutually fixed with a bonding agent (liquid resin), within the circular slot of the seat S. The conical part exerts deformation by compression toward the inside of the housing seat S and by stretching in the longitudinal direction of the sealing gasket element 1 into the seats S and the cylindrical portion then maintains the sealing gasket element 1 compressed in its seat. This tool retains the stress on the elastoplastic seal element for the time necessary to compress it and to adapt it to the cylindrical shape by compressing it on the diameter thus allowing to insert it in the seat of the mixing chamber without tearing, bucklings or creases.

When the conical insertion unit C0 is heated, the elastoplastic fitting phase is accelerated. The bush C0, if produced in a plastic material provided with poor adherence, such as for example PTFE, can also be used for the insertion of the slide-valve—provided with the pre-compressed seal element—into the seat of the mixing chamber.

As already said, once in place (i.e. wound around the slide-valve 2) and fit by elasto-plastic compression, the slide-valve 2, provided with the seal element, must be inserted frontally in the cavity 3, after previously having ensured the base body 13 of the mixing apparatus M in a stationary position.

The bush C0 can be used for the insertion in the corresponding mixing chamber of slide-valves which type is illustrated in FIG. 10 in which the longitudinal extension of the seats S is lower than the longitudinal extension of the cylindrical part 15' of the slide-valve. In this case the cylindrical part of the bush C0, during insertion, is facing the cylindrical hole of the mixing chamber 3 which has similar dimension and the slide-valve is pushed within its own seat using the equipment 10 as described later.

After the insertion of the seal-provided section, the bush is cut into parts and removed.

Normally however, the bush is used only for fitting by pre-elastoplastic deformation the seal element in the seats S.

For the insertion of the slide-valve within the respective mixing chamber other tools are also used. To this purpose, the special fitting equipment 10 is used which requires the use of temporary clamping and compression elements (C1, C2, C3; C4), and which also comprises a frame 28 suitable for firmly supporting said base body 13.

The sealing gasket element 1 can be pre-coupled pre-conformed in the respective housing seats S and by means of the bush C0, by using, in this case, a cylindrical section with a diameter exceeding the one of the slide-valve even up to 1 mm.

Subsequently, the bush is removed and the clamping collars C1, C2, C3 are applied.

The clamping collars C1, C2, C3, whose diameter of the compression cylindrical hole is similar to that of the mixing chamber or also slightly lower (up to 0.2 mm) than the one of the slide-valve, may also be directly applied for shaping and compress the sealing gasket element 1 in their seats S of the slide-valve. Similarly, the collars may be heated in order to accelerate the elastoplastic fitting. Subsequently, once the compression action of the collars is in the steady state, the step of progressive insertion of slide-valve 2 is envisaged, provided with the sealing gasket element 1 (compacted by the aforesaid clamping collars), into the mixing chamber 3.

For this purpose, the special fitting equipment 10 is used which comprises also a frame 28 suitable for firmly supporting the aforesaid base body 13, by applying to the slide-valve the temporary clamping and compression elements (CI, C2, C3; C4) individually or also coupled and arranging the slide-valve provided with clamping and compression of the elements in such a way to face the inlet hole to the mixing chamber and coupling it in the rear part to a push-element 11. The push-element 11 may in turn be implemented by means of a screw movable pin or by means of any system that allows to exert a pushing action and a slow insertion movement with the necessary force (such as a hydraulic piston).

Alternatively it is possible to push and move the head body toward the slide-valve by using an additional mobile pin carried out for instance by means of the pin 29.

In this case it is convenient to employ some longitudinal holes of the head body for the insertion of guide bars.

The clamping collars C1, C2, C3 can be progressively removed one by one to release in sequence successive parts of the sealing gasket element 1 and to progressively release the sections of the slide-valve 2, while at the same time a progressive introduction of the parts progressively freed from the slide-valve 2 is carried out in the base body 13 of the mixing head M, by exploiting the rheological characteristics, in particular the time delay that the sealing gasket element takes 1 to reach again an expanded form after it has been subjected to a compression and pre-deformation inside the respective hollow seat S.

The sealing gasket element 1, gradually released and introduced—associated to the slide-valve—in the housing cavity 3, re-expands progressively radially because of the elastic return, sealingly adhering to the inner surface of the mixing chamber 3.

For the progressive introduction of the slide-valve 2 in the housing cavity 3, for example a movable pin 11 or 29 is used, being part of the fitting equipment 10 according to the invention.

The plug 11, 29 may be driven by an hydraulic actuator which reciprocally pushes the rear part of the slide-valve 2 against the base body 13 of the mixing apparatus M, in order to introduce the stem portion 15 in the mixing chamber 3 together with the sealing gasket element 1.

As already underlined, the introduction of the stem portion 15 in the mixing chamber 3 should be suitably coordinated with the simultaneous progressive removal of the clamping collars C1, C2, C3, which step by step release in sequence the parts of the stem portion 15 to be inserted into the housing cavity 3 together with the affected portion of the sealing gasket element 1.

Figure 30:
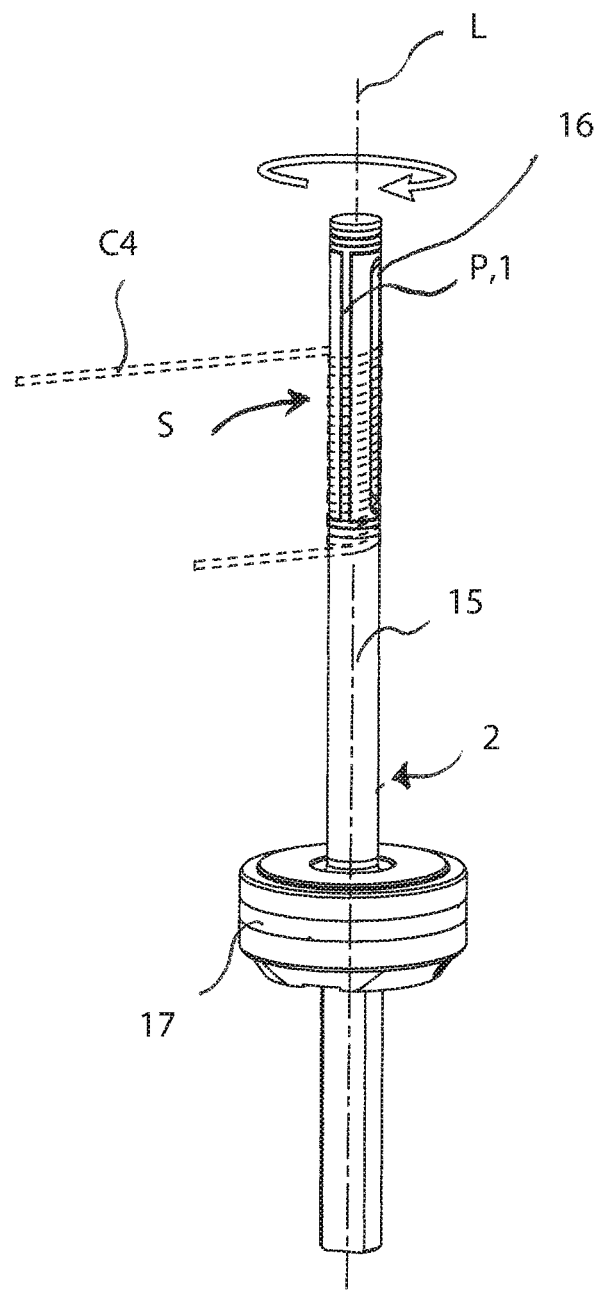
FIGS. 30 and 31 show another version of equipment and method for the application of the seal element and for assembling the slide-valve with the mixing head according to the invention.
Figure 31:
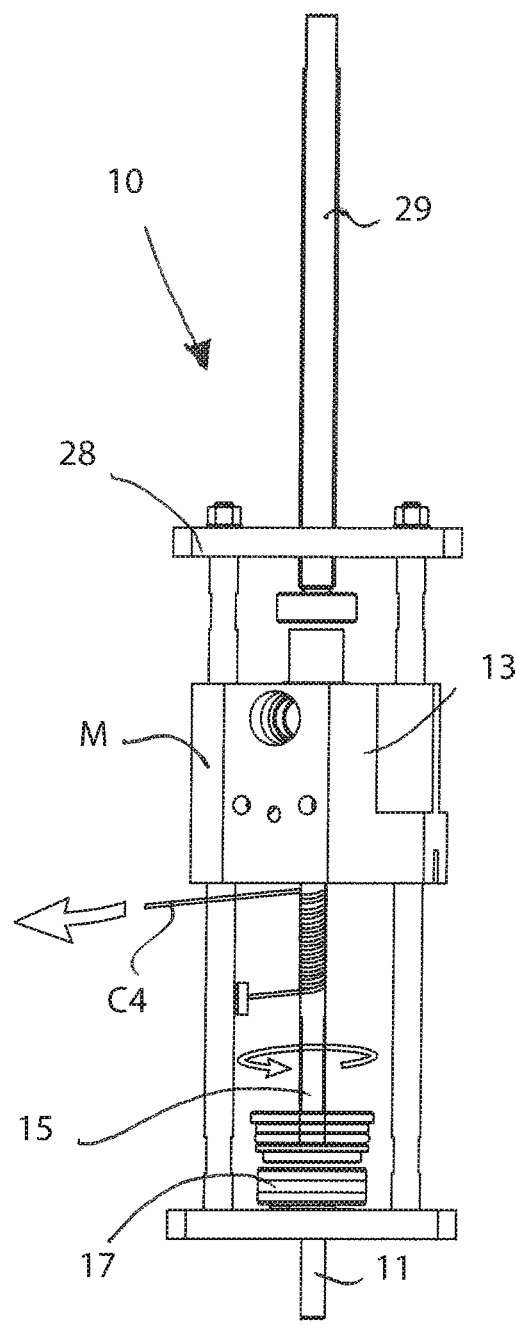

In FIGS. 30 and 31 it is shown another version of the temporary clamping element, in this case consisting of a flexible web-shaped clamping element C4 in a string-shaped flexible metal, conformed to be wound spirally around the stem portion 15 of the slide-valve 2 to keep compressed the sealing gasket element 1 and stabilize it in position in the respective housing seats before being introduced into the mixing chamber 3.

The flexible web-shaped element C4 is formed in an easily yieldable metal flat string, for example a copper alloy or aluminium.

For winding the flexible web-shaped element C4, the slide-valve 2 can be conveniently placed on a device which puts it in slow rotation: the sealing gasket element 1 is applied in correspondence of the housing seats S of housing and firstly a first terminal part of the flexible web-shaped C4 is fixed to a suitable terminal external to the slide-valve 2 but close thereto and rotating integrally with the rotation of the slide-valve 2.

The slide-valve 2 is put in slow rotation, holding manually or with braking gripper the flexible metallic web-shaped C4 in such a way to wrap spirally around the sealing gasket element 1, compressing it in the respective seats S. The flexible web-shaped C4, during the winding, is stretched in such a way as to maintain well wound and tightened the position and the shape around the sealing gasket element 1.

Once the web-shaped element C4 is wound along the whole longitudinal extension of the sealing gasket element 1, it is convenient to fix the still free end of the web-shaped element C4 at a second clamp in order to keep the latter well stretched around the element 1 itself.

The dovetail prismatic section shape of the housing seats S and the deformability of the PTFE or other elastoplastic polymer that allows a certain sliding and adaptation, ensure that the sealing gasket element 1, penetrating into it when subjected to an adequate compression, enters forcibly and conforms to the geometry of the seats S, thus remaining constrained thereto.

It can be provided, during the operation, as already seen in the previous case with the clamping collars, a step for heating the slide-valve 2 and the fitting-tools, so as to accelerate the elastoplastic adaptation of the sealing gasket element 1 in its seat.

It is necessary to wait for a certain time for the elastoplastic adjustment according to the heating temperature.

Similarly to what has already been seen previously, once the sealing gasket element 1 is well coupled, stabilized and shaped to respective housing seats S, the flexible web-shaped element C4 is progressively unwound, while simultaneously the slide-valve 2 carrying the compressed sealing gasket element 1 is introduced into the mixing chamber 3 of the head M.

Hereafter some specific features are reported which allow to optimize the results in terms of performance of the sealing system according to the invention.

In particular, the geometrical features of the housing seats S, of the cross section of the elongated portions that constitutes the sealing gasket element 1 and other geometric parameters will be detailed more specifically.

As it can be seen from the above description, the advantage of having a material with elastoplastic behavior which constitutes the sealing gasket element 1, combined with a suitable shape of the housing seats S, allows to better adapt the dimensions of the sealing gasket element 1 to the diameter tolerance of the mixing chamber 3.

Basically, the shape of the housing seats S is such as to facilitate the adaptation of the sealing gasket element 1 to the geometry both of the slide-valve 2 and the mixing chamber 3 and to prevent the relative sliding between the gasket element and the relative seat during the movement of the slide-valve within the head-body.

The cross section profile of the sealing gasket element 1 has a rectangular or trapezoidal or prismatic shape and each housing seat S has a so-called dovetail profile. The transverse section area $At$—which is formed by transversely cutting a longitudinal portion 20 or a transverse portion 21 of the sealing gasket element 1—has a variable value between 98% and 130% of the area $Ac$ o the section of the corresponding housing seat S.

Thanks to this range of values, it is possible to take into account the adaptation by compression of the sealing gasket element 1 to the shape of the housing seat (which possibly envisages rounded bottom edges and undercut zones), of the force-fitting the sealing gasket element 1 must guarantee into the cavity in which it slides, and also about the elongation in the orthogonal direction with respect to the section resulting from the assembling operations.

As shown in FIG. 12, each housing seat S can have rounded inner angles and comprises undercut side surfaces 24, diverging toward the inside, having an inclination angle G1 with respect to a centerline plane Z, ranging between 0° and 20° degrees.

Each housing seat S has a flat bottom surface 25, as shown in FIG. 12, or a V-shaped concave bottom surface 26, as shown in FIG. 13. In the latter case, the bottom surface 26 has surface areas which form a mutual angle G2 ranging between 180° to 140°.

If the PTFE is assumed as reference elastoplastic material for the sealing gasket element 1, the characteristics described below are exploited.

The PTFE can be considered an elastoplastic material since, subjected to a limited state of stress, its long molecules of carbon atoms "coated" with fluorine atoms tend to stay aggregated without sliding thanks to the "London" dispersion forces and to gradually return to the undeformed shape when the stress-state is released.

In these conditions, therefore, the PTFE behaves as an elastic material.

Otherwise, if subjected to higher state of stress, said molecules slide one on each other and the PTFE behaves as an elastoplastic material, adapting to the shape of the seat and of the wall which encloses it according to the occurred sliding and of the residual pressure.

Therefore in the adaptation process of the PTFE sealing gasket element 1 to the housing seats S and to the wall of the mixing chamber 3, the above rheological behavior is exploited with success, by pre-deforming the sealing gasket element 1 under compression for a certain period of time and then releasing the compression action but taking advantage of its gradual and initially weak elastic return for the insertion of the assembly constituted by the slide-valve 2 with the sealing gasket element 1 in the mixing chamber 3.

Another useful property of the PTFE is also exploited which is that of exhibiting a rather high friction coefficient on surfaces with which it exchanges a lower surface pressure while exhibiting considerably lower friction coefficient on surfaces with which it is contact with rather higher pressure forces.

Taking into account the above rheological behavior, the housing seats S and the geometry of the sealing gasket element 1 are deliberately configured so that there are three mutual static contact surfaces (on the bottom, at its ends and on the sidesXwhich are referred as "As") such that, when the sealing gasket element 1 is pressed and plastically flows within the corresponding seat S, some contact zones of the surfaces are at a lower pressure with respect to others, so that in any case the friction coefficient on these areas guarantee a general resultant friction on the aforesaid three "As" surfaces which, by summing the friction forces, is greater than the friction-force that develops on the free surface (which comes into contact with the surface of the mixing chamber) of the sealing gasket element 1, i.e. the outer surface intended to slide on the wall of the mixing chamber 3, to which reference is made with "Ac", in such a way to prevent any sliding/relative movement with the housing seat S.

As a result of intense and onerous studies and experimentation, it has been found that optimum results are achieved when the said static contact area As between the sealing gasket element 1 and the lateral surfaces, at the bottom and at the ends of the housing seat S, has a value greater than 1.30×Ac, wherein Ac is the outer radial surface area of the sealing gasket element 1 in dynamic contact (sliding), with the surface of the mixing chamber 3.

It should be noted that on the sliding surfaces high compression stresses and therefore low friction coefficient are generated.

On the sides and on the bottom of the seats S, because of the uncompleted sealing adaptation of sealing gasket element 1 to the shape of the seat S (especially if having a concave bottom surface), areas arise where the state of compression is smaller and therefore the specific friction is higher.

A shape of the housing seats S, in which a state of compression which prevents the longitudinal sliding of the sealing gasket element 1 in the motion direction of the slide-valve 2 during the movement of the latter, it is therefore adopted; at the same, the sealing action against pouring/leakage of liquid chemicals components is ensured by providing, by means of the pre-deformation of the sealing gasket element 1 prior to the insertion and the compression after the insertion in the slide-valve 2 in its seat, a natural adaptation of the sealing gasket element 1 to the conditions of alternated motion that occur with a high frequency in the operating life of the mixing head M, and a suitable sealing action to transfer/leakage of liquid chemical components between the slot 16 and the adjacent one as well as toward and from the delivery outlet of the head M.

In particular, it is convenient that during the step of pre-deformation a state of compression of the sealing gasket element 1 should be guaranteed which is greater than the difference of pressure between the slots 16 and which can develop on the front of the slide-valve 2 in the case of injection of the resins reagents within a mold cavity closed in pressure.

For this reason the precompression must guarantee a specific pressure on the sealing gasket element 1 which can vary from 1 N/mmq to 25 N/mmq.

In particular, for the realization of the reticular sealing gasket element 1 in elastoplastic material, particular attention is paid so that the sections of the same sealing gasket element 1 show higher values with respect to the corresponding housing seats S intended to receive it. The convenient oversizing of the section of the sealing gasket element 1 is appropriately chosen so as to achieve an effective sealing action which prevents the resin leakage from a recirculation slot 16 to the other contiguous recirculation slot 16 and to prevent the leakage of resin from each respective recirculation slot 16 toward the dispensing duct. More precisely, the sections of the reticular sealing element 1 are larger than the sections of the housing seats S in such an extent to exert a pressure on sliding surface which is at least 20% higher with respect to the pressure difference between the fluid which is present in each recirculation slot 16—sealingly surrounded in a liquid-proof way by the reticular sealing element 1—and in the contiguous recirculation slot 16 and at least 15% higher than the pressure difference between the reagent resin delivered to the mold and the reactive resin in the respective recirculation slot 16.

As a matter of fact, in the numerous tests carried out after the insertion and after the thousands of cycles performed with the reagents resins, there is no longitudinal sliding of the sealing gasket element 1 relatively to the slide-valve 2, and a sealing action is guaranteed with success between the recirculation slots 16 also with pressures—of one of the reactive resins-equal to 100 bar (10 MpA), obtained by dispersion of carbon dioxide $CO_2$ in supercritical state within a polyol.

Owing to the described method, there is obtained for the slide-valve 2 an effective hydraulic or fluidic seal, in pressure, through the realization and the application of a reticular gasket element 1 above described.

The method and the special fitting equipment 10 described above allow to overcome the previously mentioned limits and drawbacks.

Thanks to the invention, a rapid and easy application of the sealing gasket element 1 with a material which is widely compatible is achieved; there is no need to clean the housing seats with solvents, there is absolutely no risk for air bubbles inclusions; the problems and the onerous operations are avoided that are mentioned in the state of the art which result in the re-shaping by grinding/turning the sealing resin and the complicated and expensive actions such as heating operations, coating resin, put in rotation of the slide-valve and the waiting times for the polymerization of the sealing resin that occur in the known systems.

Thanks to the invention, a sealing gasket element having a very reduced sliding friction coefficient is obtained, whose operating duration is at least twice with respect to the sealing elements generated by polymerization of known-type resin.

Thanks to the invention, a highly performing, reliable and durable sealing system is obtained.

The transverse sealing portions 21 which extend circumferentially around the longitudinal axis L and the longitudinal seal portions 20, parallel to the aforementioned longitudinal axis L, housed in the housing seats S of the stem portion 15, fully perform their function of preventing a leakage of polymeric components from a longitudinal slot 16 toward another longitudinal slot 16 and prevent leakage of reactive components and/or of the reagent mixture from the recirculation slots toward the housing cavity 3 and the rear regions of the slide-valve 2 and/or from the mixing chamber 3 toward the recirculation slots in the case where higher pressures with respect to the recirculation slots occur inside the mixing chamber.

It is possible to configure and dimensions of the element 1 in a desired way according to the applications for which it is intended.

The materials, in the case in which they are compatible with the specific use for which they are intended, can be selected appropriately according to the requirements and in function of the available state of the art.

Variations and/or additions may be made to the invention as described above and illustrated in the enclosed drawings, without departing from the claimed scope of protection.

What we claim is:

1. High-pressure mixing apparatus for polymer components that are suitable for forming a chemically reactive mixture, comprising:
    a base body defining internally a mixing chamber that is suitable for receiving, by respective injection openings or nozzles, jets of said reactive polymer components,
    a slide valve member having a stem portion extending with a longitudinal axis and connected behind to a piston drive portion, on said stem portion two or more longitudinal slots being obtained for recirculating polymer components,
    said slide valve member being reciprocal in said mixing chamber between a retracted open position, which enables jets to be mixed by turbulence in the mixing chamber, and the subsequent dispensing of said mixture, and an advanced position for expelling residual reactant residues to a mould and closing said mixing chamber, in which advanced position said jet injection openings are placed in communication by said longitudinal recirculation slots with respective recirculating openings made on said body,
    WHEREIN said slide valve member stem portion has a cylindrical surface suitable for coupling with the cylindrical surface of said mixing chamber in which said slide valve member is slidable with preset clearance, said stem portion cylindrical surface containing housing seats formed with a grid shape such as to surround, without intersecting and without discontinuity, said longitudinal recirculation slots;
    a seal gasket element obtained from a precursor element made of an elastoplastic material separately from said slide valve member, said seal gasket element being further provided with longitudinal seal portions, parallel to said longitudinal axis, and transverse seal portions that extend circumferentially around said longitudinal axis, said seal gasket element being coupled with said slide valve member and being formed with a grid structure with a reticular shape corresponding to that of said housing seats, said longitudinal seal portions and transverse seal portions having enlarged sections with respect to the respective housing seats, the enlarged sections are housed with forced positioning in the respective housing seats on said stem portion cylindrical surface and being configured for exerting pressure on the surface on which they slide so as to avoid a leak of polymer components from a said longitudinal slot to another said longitudinal slot and avoid a leak of reactant mixture from said mixing chamber to the recirculation slots of said slide valve member when the resins are dispensed into the mould.

2. High-pressure mixing apparatus according to claim 1, wherein the longitudinal extent of said seal gasket element is variable from +5% to −22% with respect to the corresponding length of the respective longitudinal housing seats to take account of the elongation deriving from the forced positioning with pressure into said respective housing seats (S) and to take account of section contraction following the forced positioning.

3. High-pressure mixing apparatus according to claim 1 wherein the circumferential extent of said seal gasket element is variable from +5% to −5% with respect to the corresponding circumferential length of the transverse housing seats to take account of both the compression of said seal gasket element and forced positioning in the respective seats and to induce forced joining of two terminal ends of said seal gasket element.

4. High-pressure mixing apparatus according to claim 1, wherein said housing seats have a continuous reticular distribution, are obtained in the cylindrical surface of said slide valve member stem portion around the recirculation slots and can comprise one or more contiguous portions with a maximum of three both longitudinal and circumferential portions, said housing seats being shaped with one or more longitudinal segments and with one or more circular segments that intersect mutually, defining intersection points that are at right angles or with rounded corners, and in which the profile of the cross section of said housing seats has a rectangular profile or a dovetail profile.

5. High-pressure mixing apparatus according to claim 1, wherein the profile of the cross section of said seal gasket element has a rectangular or trapezium shape, in which the area of said cross section has a value which is variable between 98% and 140% of a section area of the respective housing seat.

6. High-pressure mixing apparatus according to claim 1, wherein the thickness of the cross section of said seal gasket element is greater than the value of the clearance between the slide valve member and the mixing chamber by a quantity greater than 10 micron.

7. High-pressure mixing apparatus according to claim 1, wherein each housing seat has rounded inner angles and comprises undercut side surfaces, diverging inwardly, having a tilted angle, with respect to a center plane, which is variable between 0° and 20° degrees.

8. High-pressure mixing apparatus according to claim 1, wherein each housing seat has a flat bottom surface or a concave "V"-shaped bottom surface with surface zones that mutually form an angle that is variable from 180° to 140°.

9. High-pressure mixing apparatus according to claim 1, wherein the static contact area between said seal gasket element and the side, bottom and end surfaces of the respective housing seat has a value greater than 1.30*(Ac), where (Ac) is the area of the radial outer surface of said seal gasket element in contact with, and slidable on, the surface of said mixing chamber.

10. High pressure mixing apparatus according to claim 1, wherein said longitudinal seal portions and said transverse seal portions are made of an elastoplastic material having a low friction coefficient and chosen from a group comprising PTFE, ETFE, CTFE, PFA, FEP, E-CTFE, and PVDF.

* * * * *